United States Patent [19]

Stratton

[11] 4,311,915
[45] Jan. 19, 1982

[54] ELECTRO-OPTICAL PRESENCE DETECTION SCANNER

[75] Inventor: Richard L. Stratton, Lake Oswego, Oreg.

[73] Assignee: Dyna-Tech Corp., Portland, Oreg.

[21] Appl. No.: 94,547

[22] Filed: Nov. 15, 1979

Related U.S. Application Data

[63] Continuation of Ser. No. 634,066, Nov. 21, 1975, abandoned.

[51] Int. Cl.³ .......................................... G01N 21/86
[52] U.S. Cl. ................................... 250/561; 250/235
[58] Field of Search ............... 250/221, 222, 223, 560, 250/561, 216, 234–236; 356/381, 383–387

[56] References Cited

U.S. PATENT DOCUMENTS

| | | | |
|---|---|---|---|
| 3,016,464 | 1/1962 | Bailey | 250/560 |
| 3,742,225 | 6/1973 | Sick et al. | 250/223 R |
| 3,943,361 | 3/1976 | Miller | 250/560 |

Primary Examiner—David C. Nelms
Attorney, Agent, or Firm—Kolisch, Hartwell & Dickinson

[57] ABSTRACT

A system for viewing a zone to detect the presence of an article carried therein on a conveyor. In one embodiment, the system includes a laser source which projects a line-beam of coherent light toward the zone, which beam is intersected, along a length thereof, by the planar field of view of a reflection detector whose view-plane contains the beam. In another embodiment, the system uses a laser source which projects a planar beam of coherent light which is intersected by the field of view of a reflection detector whose view-field has both length and breadth dimensions where it intersects the laser beam. In both embodiments, the region of intersection of the laser beam and the detector's field of view is spaced from the conveyor.

5 Claims, 5 Drawing Figures

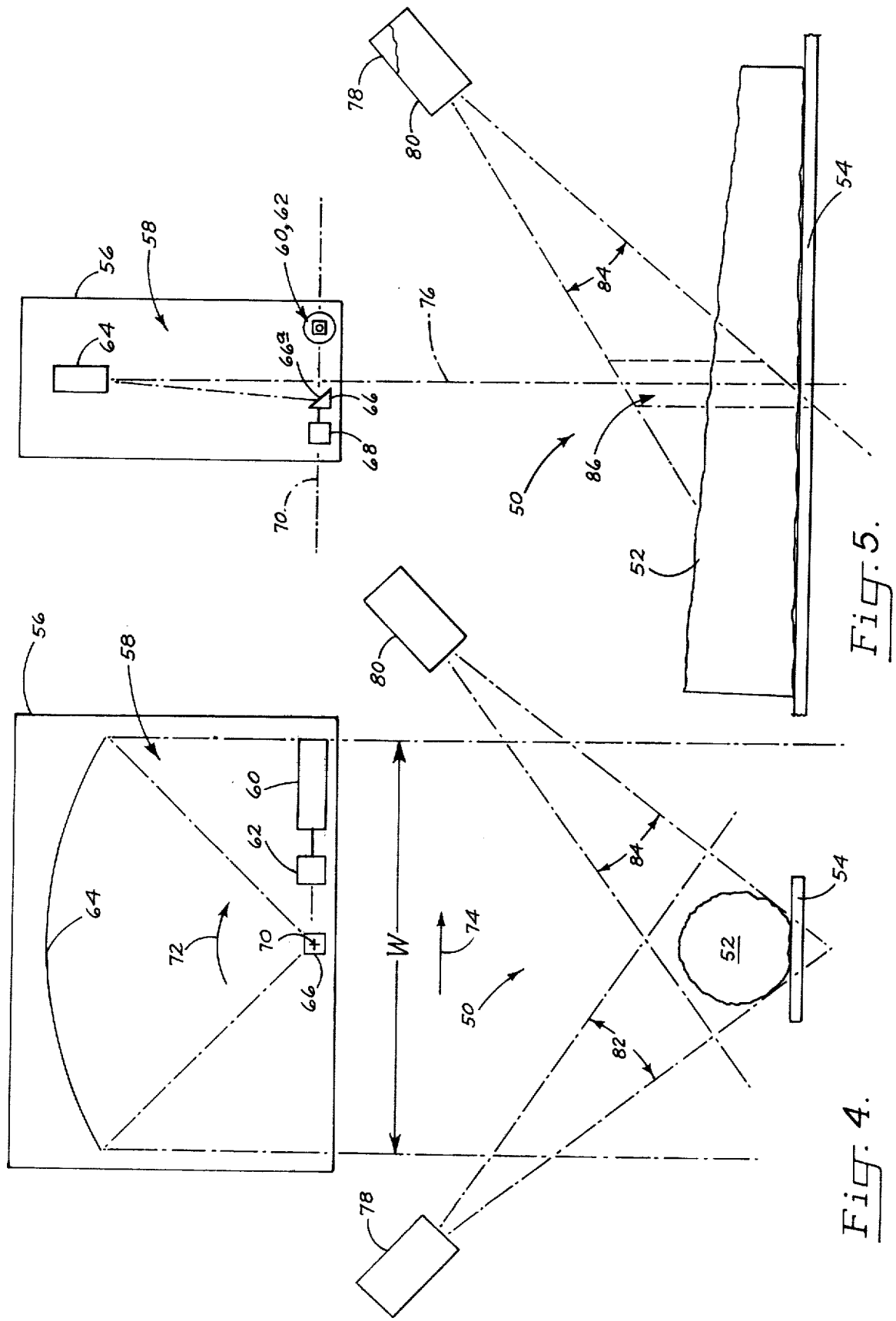

ELECTRO-OPTICAL PRESENCE DETECTION SCANNER

BACKGROUND AND SUMMARY OF THE INVENTION

This application is a continuation of application Ser. No. 634,066 filed Nov. 21, 1975, now abandoned, entitled Electro-optical Monitoring System.

This invention pertains to a system for viewing a selected zone to detect the presence of an article in the zone. More particularly, it pertains to such a system which utilizes a beam of light, such as that produced by a laser, which beam is intersected by a defined wide-expanse field of view of a reflection detector, with the region of intersection of these two things lying within the selected zone.

There are various applications in which it is desired to provide an automatic monitoring or detection system for noting the presence of an article in a selected zone. For example, it is typical in many saw mills to note the presence of a log carried either sideways or endwise into such a zone for the purpose of producing some control function, such as the operation of a saw.

Typical detection systems include a source of light, such as a laser, which projects a beam toward a conveyor on which an article is carried, with a detector placed in the path of the beam so as to be able to note any interruption in the beam, thus to indicate, presumably, the presence of an article. This type of system, however, is subject to severe disadvantages, in that under operating conditions, it is often the case that various kinds of debris, other than an article of interest, are carried on the conveyor and interrupt the light beam, just as the desired article would. Furthermore, passage of conveyor parts or other structure across such a beam has often been the cause of false responses.

A general object of the present invention is to provide a unique monitoring system which completely avoids these difficulties in an extremely practical and satisfactory manner. According to one embodiment of the proposed invention, the system includes a laser source which projects a line-beam of coherent light toward a selected zone, which beam in intersected, along a length thereof, by the planar field of view of a reflection detector whose view-plane contains the beam. The region of intersection of the beam and the field of view is referred to as a sensitivity region, and this region is positioned so that it is spaced appropriately from any conveyor or other support means for an article in the zone.

In another embodiment of the invention, the system uses a laser source which projects a planar beam of coherent light, which beam is intersected by the field of view of a reflection detector whose view-field has both length and breadth dimensions where it intersects the beam. Again, the region of intersection is referred to as a sensitivity region, and is spaced from whatever is used to support or convey an article in the zone.

With such constructions, it will be apparent that debris or other materials carried on a conveyor, other than those articles which are intended to be detected, can be prevented from producing a false signal. Further, it will be obvious that such a system is not affected by movement of parts in a conveyor which extends past the zone.

As will become apparent from the description which follows below, the proposed system, in both described embodiments, is extremely simple, and can readily be incorporated for use in a number of applications. Further, the proposed system is capable of extremely accurate, trouble-free operation.

These and other objects and advantages which are attained by the invention will become more fully apparent as the description which now follows is read in conjunction with the accompanying drawings.

DESCRIPTION OF THE DRAWINGS

FIG. 4 is a schematic end view of a log-scaling station in a sawmill in connection with which another embodiment of the instant invention is used.

FIG. 5 is a side view of the station of FIG. 4.

DETAILED DESCRIPTION OF THE INVENTION

Figure 1:
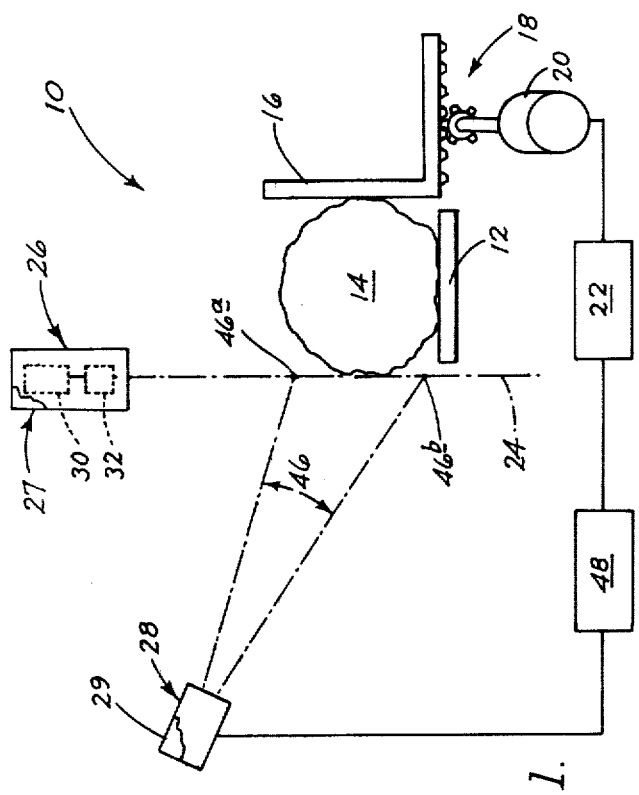
FIG. 1 is a schematic view of a log-positioner in a sawmill in connection with which one embodiment of the system of the present invention is used.
Figure 2:
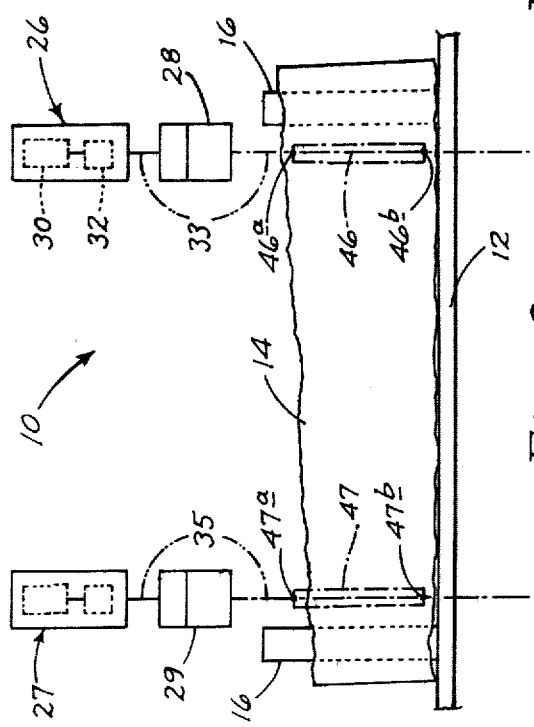
FIG. 2 is a side view taken from the left side of FIG. 1.

Turning now to the drawings, and referring first to FIGS. 1 and 2, indicated generally at 10 is a positioning station, or zone, in a sawmill where logs are to be positioned prior to their being fed endwise into a saw. Provided for carrying logs endo into this station, and ultimately into a saw, is a movable carriage 12. A log 14 is shown on the carriage in the station.

Provided on one side of the carriage is a laterally shiftable positioner including upright independently movable arms 16 which may be shifted toward and away from the carriage for the purpose of aligning a log thereon as desired. Shown schematically at 18 in FIG. 1, as being associated with the positioner arm seen in this figure, is a rack and pinion drive which is driven by an electric motor 20. A like drive and motor are provided for the other arm. The motors are started and stopped through suitable conventional control apparatus, such as that represented in block form at 22.

What has been described so far is entirely conventional. What is intended with this apparatus is that logs, such as log 14, are brought into station 10 on carriage 12 so that they may be engaged by arms 16 of the positioner. Prior to feeding such logs endwise into a saw, it is desired that each log be positioned laterally on the carriage, whereby its side which is opposite arms 16, extends no further than a selected plane, such as that shown represented by line 24 in FIG. 1. When a log is so positioned, it is in proper lateral alignment for feeding into the mentioned saw.

Provided according to the present invention for assisting in so positioning logs is a monitoring system including a pair of modulated laser sources 26, 27 and a pair of reflection detectors 28, 29 which are sensitive to the beams emitted by the sources. Sources 26 and detector 28 are associated with the right-hand arm 16 in FIG. 2, and source 27 and detector 29 are associated with the left-hand arm in this figure. The two sources are identical. Such also is true with respect to the detectors.

Source 26 includes a conventional laser 30 suitably coupled to a conventional amplitude modulator 32 which operates herein at a frequency of about 2000 Hz. The reason for using a modulator will be explained more fully shortly. Source 26 herein, when operating, projects along a line 33 (see FIG. 2) a modulated linear laser beam which occupies previously mentioned plane 24. Source 27 projects a similar beam along a line 35 (see FIG. 2) which also occupies plane 24.

Figure 3:
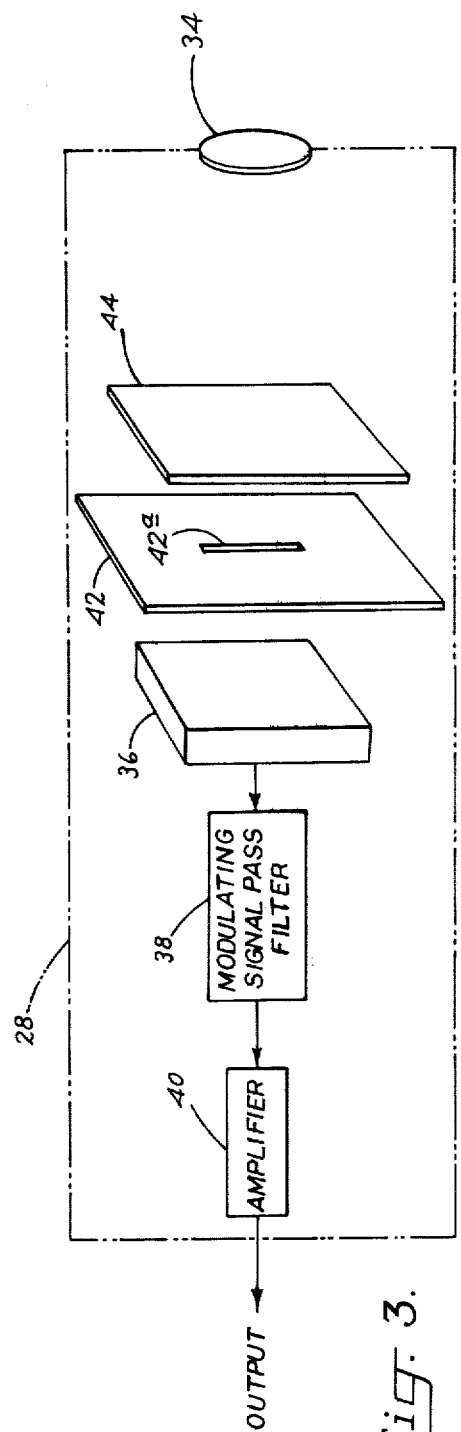
FIG. 3 is a schematic diagram of a detector used in the system of FIGS. 1 and 2.

Referring to FIG. 3 along with FIGS. 1 and 2, detector 28, inside its housing, includes a lens 34, a relatively large-area photodetector 36 which is coupled electrically through a modulating signal-pass filter 38 with an output amplifier 40. All of these components in the detector are conventional. Filter 38, in effect, "tunes" the detector for being sensitive only to reflected laser radiation which is modulated at the frequency of modulator 32. Thus, it will be seen that the reason for using and detecting a modulated laser beam is to increase the sensitivity of the overall system by making the system in effect, reject all other sources of optical radiation.

Provided between photodetector 36 and lens 34 are a field-of-view mask 42, and in front of this, a band-pass optical filter 44. Filter 44 is selected to pass, essentially, only light coming from laser 30. Provided in mask 42 is an elongated thin linear slot 42a, the purpose for which will be explained shortly.

As is clearly implied by its name, mask 42 defines the field of view of detector 28. With this mask being provided with slot 42a, the field of view of detector 28 is substantially planar. This field of view is indicated at 46 in FIGS. 1 and 2, and it will be noted that the field has a wide expanse where it is adjacent station 10. Further describing the situation which exists, field of view 46 occupies a plane parallel to that of FIG. 1, and contains previously mentioned line 33. It will be noted that the upper reach of the field of view intersects line 33 at 46a and the the lower reach of the field intersects the line at 46b. Attention should especially be called to the fact that intersection point 46b is disposed above the top of carriage 12. Thus, the whole region, which is a linear region, wherein field 46 and line 33 intersect is spaced above the carriage. This intersection region is referred to herein as a sensitivity region.

Detector 29 has a field of view 47 which is like field 46 except that it contains line 35. This field is shown in FIG. 2. It will be noted that field 47 has an upper intersection with line 35 at 47a, and a lower intersection with this line at 47b. Point 47b is at substantially the same elevation above conveyor 12 as point 46b.

Referring again particularly to FIG. 3, a feature of the detector 28 which should be noted is that mask 42 may be laterally repositioned within the housing of the detector. The design of the specific means for allowing this is not important herein, and hence is not shown. It will be evident that repositioning of the mask will relocated slot 42a, so as to shift the field of view of the detector. This feature is a desirable one in that it enables quick mounting of the detector in place, and ready fine adjustment of the location of the field of view so as to select precisely the region of intersection of this field and a laser beam like that which is projected from source 26.

The output of amplifier 40 in detector 28 is coupled to conventional control apparatus represented in block form at 48. Control apparatus 48 is in turn connected to previously mentioned motor controller 22. The amplifier in detector 29 corresponding to amplifier 40 is similarly connected to control apparatus 48. The functioning of apparatus 48 will be explained shortly.

Explaining now how the system of the invention which has been described so far performs, sources 26, 27 and detectors 28, 29 are energized. As a consequence, the sources project line-beams of modulated laser light along lines 33, 35 in plane 24. The detectors view these beams in the planar fields of view shown at 46, 47, for the purpose of detecting any reflected laser light. Light other than that produced by the lasers will be rejected by the detectors, both because of the presence of amplitude modulation which is used with respect to the beams, and because of the presence of band-pass optical filters in the detectors.

A log is carried endwise into station 10 on conveyor 12 and is stopped so that it may be engaged by positioner arms 16. A suitable command is given to turn on the motors for the positioner arms, whereupon these arms advance toward the log across the conveyor.

It will typically be the case that one end of a log will be moved to where it intersects plane 24 before this happens with respect to the other end of the log. Assuming that what is shown as the right-hand end of log 14 in FIG. 2 is first to intersect plane 24, when this occurs, the part of the log which intersects the plane, it will be seen, lies within the field of view of detector 28, and also intersects the beam of light being projected from source 26. As a consequence, light will be reflected to detector 28 which will then produce a control signal from amplifier 40 which, through the actions of control apparatus 48 and motor controller 22, shuts off motor 20.

The other positioner arm which is moving the left end of the log in FIG. 2 toward plane 24 will continue to operate until this end also intersects the plane. Like action will then take place with respect to the motor operating this other positioner arm. More particularly, such intersection of plane 24 will result in light being reflected to detector 29 which, again through the combined actions of apparatus 48 and controller 22, will shut off the motor provided for this other arm.

Log 14 is then properly positioned for advancement into a saw.

It will especially be noted that because of the way in which the fields of view of the detectors are arranged to intersect the line-beams of light from the laser sources, any debris which may be carried on conveyor 12 will not produce any reflected light which might be detected by the detectors to produce false control signals. Also, it will be noted that the sensitivity regions defined by the lengths of intersections of the fields of view and the laser beams are suitably spaced from the conveyor, whereby movement of the conveyor parts will not effect any false control signals.

Let us consider now the embodiment of the invention illustrated in FIGS. 4 and 5. Shown herein generally at 50 is a station for scaling logs, through which station logs, such as log 52, are transported by an elongated conveyor 54. Suitably disposed above conveyor 54, in a housing 56, is a laser source 58 including a laser 60 which is like previously described laser 30, and an amplitude modulator 62 which is like previously described modulator 32. Also included in source 58, within housing 56, are a parabolic mirror 64, a rotary-mounted mirror 66, and a motor 68 which is drivingly connected to mirror 66 to rotate the same. Mirror 66 is rotatable about a horizontal axis shown at 70—this axis lying in the same horizontal plane containing laser 60 and modulator 62.

The relative positions of the laser, modulator and rotating mirror in FIGS. 4 and 5 are shown only schematically in these figures. The laser and modulator are positioned so as to project a modulated laser beam toward the inclined surface 66a of mirror 66, with this beam lying in the same horizontal plane containing axis 70. With rotation of the mirror, in the direction of arrow 72 seen in FIG. 4, the rotating mirror scans the beam of the laser along and across the parabolic surface of mirror 64. The direction of travel of the scanned beam across the mirror is indicated by arrow 74 in FIG. 4.

With operation of source 58, therefore, what is produced is a substantially vertical, planar, swept beam of laser light which occupies the vertical plane shown at 76 in FIG. 5, and which has the width indicated as W in FIG. 4. It will be seen that this planar beam is directed toward conveyor 54, and extends a considerable distance on opposite sides of the conveyor.

Also included in the monitoring system used in conjunction with scaling station 50 are two detectors 78, 80 which are each extremely similar in construction to previously described detector 28, except that the fields of view of detectors 78, 80 are pyramidal rather than planar. The configuring of such fields of view for these detectors may readily be accomplished by providing them with masks, such as mask 42a, in which a generally rectangular aperature is provided for defining such fields of view. The fields of view of detectors 78, 80 are shown at 82, 84, respectively.

As can be seen in FIG. 4, detectors 78, 80 are located above and on opposite sides of conveyor 54, and look downwardly at angles toward the conveyor. As can be seen in FIG. 5, the detectors are located longitudinally to one side of source 58 whereby they look downwardly at an angle toward conveyor 54 in the region of plane 76.

It will thus be apparent that the fields of view of the detectors, where these fields intersect plane 76 (which is the plane of the scanned laser beam) produce regions of intersection which have both length and breadth dimensions in plane 76. Such a region of intersection, called a sensitivity region, is shown generally at 86 in FIG. 5. An important consideration herein is that the detectors are also oriented whereby no portions of their fields of view in the region of intersection with plane 76, touch conveyor 54. Further, these regions of intersection are located above the top surface of the conveyor.

In the system shown in FIGS. 4 and 5, it is intended that output signals from the detectors be used to compute log diameter along the length of a log such as log 52. The exact way in which such computations are performed is no part of the present invention. However, reference may be made herein to copending U.S. application Ser. No. 572,221, filed Apr. 28, 1975 by Clifford H. Moulton for "Scaling Apparatus With Linearization Compensation" issued as U.S. Pat. No. 3,997,269 on Dec. 14, 1976. In this prior-filed patent application, there is disclosed apparatus usable in the present system to relate the output signals produced by detectors 78, 80 to the angular position of mirror 66 with respect to mirror 64, whereby log diameter dimensions may accurately be determined.

Regardless of how the output signals produced by detectors 78, 80 are specifically used, the system shown in FIGS. 4 and 5 performs with mirror 66 scanning a beam of laser light in plane 76, which beam is viewed in the fields of view of detectors 78, 80 to look for any reflections. Just as was the case with the system shown in FIGS. 1 and 2, wood chips or other debris carried on conveyor 54 will produce no false output signals. Further, movement of the conveyor parts will not produce such a signal. The only event which will result in a signal, which will be a proper signal, is the presence in a region of intersection of a field of view of one of the detectors and plane 76 of an object which reflects the scanned laser beam. The arrangement of the detectors, as has been explained, is such that this event will only occur when an article of interest, such as log 52, intersects one of these regions.

It will thus be apparent that a very simple and effective system is proposed by the invention for monitoring the presence of an article at a selected location. The system can be used also for measuring dimensions. By utilizing beams of optical radiation, such as those described, which beams are intersected by the angularly disposed, defined wide-expanse fields of view of optical detectors, sensitivity regions are defined which may be geometrically spaced so as to avoid false-signal problems which have characterized previously available scanning or monitoring equipment. It will also be apparent that a system embodying the invention may take a number of different forms and may readily be incorporated in various different kinds of apparatus. Further, by equipping a detector in the system with a shiftable mask, such as that described herein, placing of a system becomes an extremely simple operation, since fine adjustments for positioning the desired region of sensitivity may be made simply by shifting the position of the mask in the detector. It will be recognized, of course, that fields of view may be specially configured to suit different applications.

While two embodiments of the invention have been described herein, it is appreciated that other variations and modifications may be made without departing from the spirit of the invention.

It is claimed and desired to secure by Letters Patent:

1. An electro-optical monitoring system for noting only the presence of an article in an observation zone comprising means adjacent said zone for supporting an article thereon, means for projecting into said zone a beam of optical radiation having essentially no more than two dimensions, said beam, when viewed from at least one side thereof, further having substantially the appearance of a straight line, and reflection detector means sensitive to such radiation and having a defined wide-expanse field of view which intersects said beam along a finite length thereof measured on the projection axis of the beam, such intersection producing a sensitivity region in said zone so that when the article is shifted into said sensitivity region to intersect said sensitivity region said detector means will receive reflected radiation, said projecting means and said detector means being oriented relative to one another whereby the latter is unable to view directly radiation projected by the former and only can perceive radiation emitted from the former after reflection from the article positioned within said sensitivity region, and said sensitivity region being spaced from said support means a distance for substantially preventing debris on said support means from intersecting said sensitivity region.

2. The system of claim 1, wherein said beam, when viewed from any side, appears as a substantially straight line, and the field of view of said detector means occupies a plane containing said beam.

3. The system of claim 1, wherein said beam is planar, and the field of view of said detector means, where it intersects said beam, has length and breadth dimensions in the plane of said beam.

4. A method for electro-optically noting only the presence of an article in an observation zone comprising
providing an article on a support means,
projecting into said zone a beam of optical radiation having essentially no more than two dimensions, said beam, when viewed from at least one side thereof, further having substantially the appearance of a straight line,
producing a sensitivity region in said zone by intersecting said beam along a finite length thereof measured on the projection axis of said beam with a wide-expanse field of view,
shifting the article until it intersects said sensitivity region, and
detecting light radiated from said sensitivity region.

5. The method of claim 4 wherein said producing step also includes spacing said sensitivity region from said support means so that debris on said support means may not intersect said sensitivity region.

* * * * *